Figure 1:
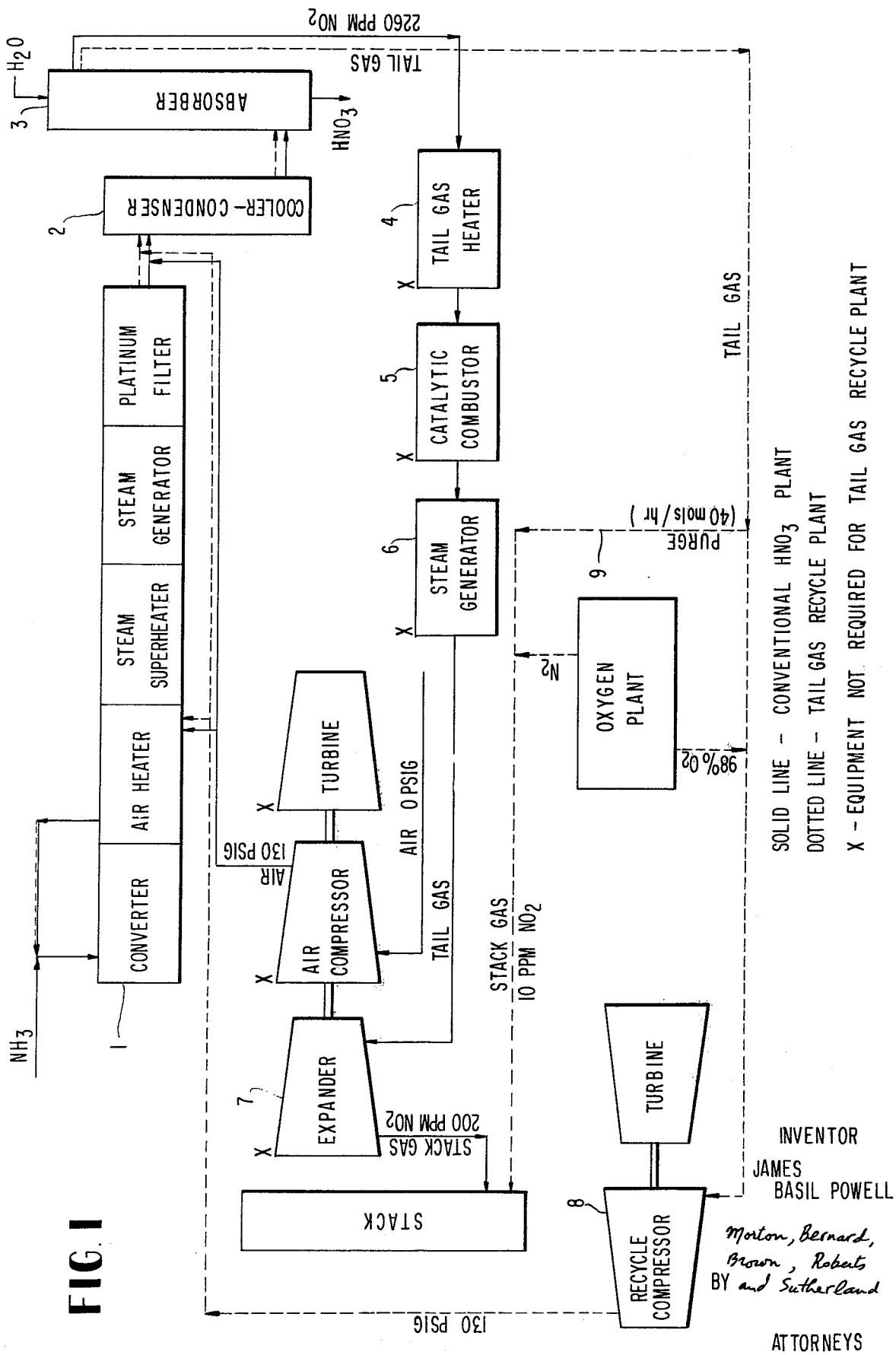

United States Patent [19]

Powell

[11] 3,927,182

[45] Dec. 16, 1975

[54] PROCESS FOR MAKING NITRIC ACID BY THE AMMONIA OXIDATION-NITRIC OXIDE OXIDATION-WATER ABSORPTION METHOD

[76] Inventor: James Basil Powell, 1410 Ellison Lane, Lakeland, Fla. 33801

[22] Filed: June 14, 1973

[21] Appl. No.: 370,158

Related U.S. Application Data

[63] Continuation-in-part of Ser. No. 118,676, Feb. 25, 1971, abandoned.

[52] U.S. Cl. .............................................. 423/392
[51] Int. Cl.² ........................................ C01B 21/38
[58] Field of Search .................................... 423/392

[56] References Cited
UNITED STATES PATENTS

| | | | |
|---|---|---|---|
| 1,292,814 | 1/1919 | Landis | 423/392 |
| 1,304,707 | 5/1919 | Rabinovitz | 423/392 |
| 1,663,914 | 3/1928 | Liljenroth | 423/392 |

FOREIGN PATENTS OR APPLICATIONS

| | | | |
|---|---|---|---|
| 502,155 | 4/1937 | United Kingdom | 423/392 |

OTHER PUBLICATIONS

Sze et al.; "Chemical Engineering" Aug. 1946, pp. 113–115.

*Primary Examiner*—G. O. Peters
*Attorney, Agent, or Firm*—Morton, Bernard, Brown, Roberts & Sutherland

[57] ABSTRACT

An improved process for the preparation of nitric acid by the ammonia oxidation-nitric oxide oxidation-water absorption method characterized by substantially reduced nitrogen oxide emission is disclosed. The reduction in nitrogen oxide emission is accomplished by the use of tail gas recycle and a high oxygen content gas instead of air to supply the oxygen required by the process.

9 Claims, 2 Drawing Figures

PROCESS FOR MAKING NITRIC ACID BY THE AMMONIA OXIDATION-NITRIC OXIDE OXIDATION-WATER ABSORPTION METHOD

This is a continuation-in-part application of copending application Ser. No. 118,676, filed Feb. 25, 1971, now abandoned, which is incorporated herein by reference.

This invention relates to the improved production of nitric acid by the ammonia oxidation-nitric oxide oxidation-water absorption method. More particularly, this invention relates to the improved production of nitric acid by the ammonia oxidation-nitric oxide oxidation-water absorption method characterized by substantially reduced nitrogen oxide emission accomplished by the use of tail gas recycle and a high oxygen content gas as the source of oxygen supply for the process.

Virtually all commercial nitric acid production is by the ammonia oxidation-nitric oxide oxidation-water absorption method. The method normally comprises the following three stages:

1. the oxidation of ammonia with an oxygen-containing gas to form nitric oxide, NO;
2. the further oxidation of nitric oxide with an oxygen-containing gas to form nitrogen peroxide, a mixture of $NO_2$ and $N_2O_4$;
3. the absorption of nitrogen peroxide in water to form a solution of nitric acid.

The basic reactions for each of the three stages are given as follows:

(1) Oxidation of Ammonia
$$4NH_3 + 5O_2 \rightarrow 4NO + 6H_2O$$

Ammonia is oxidized to form nitric oxide and water. This is a highly exothermic reaction which proceeds rapidly at high temperatures in the presence of a catalyst. While various metallic oxides have been used, the catalyst most frequently used is platinum, or platinum-alloy wire woven into fine mesh gauze. The reaction is normally carried out at above about 1200°F., e.g. about 1650°F., with a very short contact time which reduces undesirable side reactions that occur on prolonged contact with the catalyst. Under conditions normally used, about 94–96% of the ammonia is converted to nitric oxide as the reaction proceeds at a very rapid rate. The remainder of the ammonia participates in side reactions, primarily $4NH_3 + 3O_2 \rightarrow 2N_2 + 6H_2O$.

(2) Oxidation of Nitric Oxide
$$2NO + O_2 \rightarrow 2NO_2 \rightleftarrows (NO_2)_2$$

Nitrogen dioxide formed from the oxidation of nitric oxide exists in equilibrium with its dimer, $(NO_2)_2$ or $N_2O_4$. This equilibrium mixture of nitrogen dioxide and its dimeric form are herein referred to as nitrogen peroxide. The oxidation of nitric oxide proceeds spontaneously at atmospheric temperatures but contrary to the general rule in such cases progresses at a relatively slow rate. The reaction also differs from general rules in that it proceeds more rapidly with lowered temperatures whereas most reaction rates increase as the temperature is increased. For these reasons the oxidation of nitric oxide is usually carried out at as low a temperature as economically practical and a relatively long retention time is provided. The reaction is exothermic, and, therefore, cooling must be provided to remove the heat of reaction as well as to cool the gas to the temperature desired for the nitric oxide oxidation. Normally the temperature for final reaction is about 60°–130°F.

(3) Absorption of Nitrogen Peroxide in Water
$$3NO_2 + H_2O \rightarrow 2HNO_3 + NO$$

Nitrogen peroxide reacts with water to form $HNO_3$ which is then absorbed into additional water added in sufficient excess over the reaction requirement to produce nitric acid of the desired strength, usually in the range of about 55–65 percent by weight $HNO_3$. The other reaction product, NO, further reacts by a continuation of the oxidation reaction of the preceding stage. Therefore the absorption tower has a temperature and retention time characteristics such that the rate of NO oxidation coincides with the rate of formation of $HNO_3$, and both reactions proceed simultaneously throughout the tower. Usually the temperature is controlled by using a flow of cooling water through coils placed within the tower. Refrigerated cooling has been used for the nitric oxide oxidation and absorption stages but the added benefits usually do not justify the added expense for refrigeration. Normally the absorption stage is carried out at about the same or slightly lower temperature than the nitric oxide oxidation stage, and the overall efficiency of the two stages combined is normally about 98% based on conversion of NO to $HNO_3$.

The reactions in the nitric oxide oxidation and absorption stages are favored by an increase in the pressure of the reactants, and the pressure effects are highly significant in these stages. The earliest plants operated at substantially atmospheric pressure. As suitable materials of construction became available, pressures were increased to gain the benefits from operating at higher pressures. For a period of time pressures of about 4 atmospheres were normally used. Presently most of the newer plants operate at about 8–9 atmospheres; however, some of the older low pressure plants remain in production. Sometimes the nitric oxide oxidation and absorption stages are conducted at a higher pressure than the ammonia oxidation, since it is believed by some that the best overall economics can be thus achieved. The process of this invention may be advantageously applied to any of the pressures that have been used, and even to higher pressures than have yet been used.

A comprehensive review entitled *Nitric Acid Technology Recent Developments* 1969, Chemical Process Review No. 30, by Dr. Robert Powell and available from the Noyes Development Corporation; and *Strong Water-Nitric Acid, Its Sources, Methods of Manufacture and Uses* (1968), by Thomas H. Chilton and available from the M.I.T. Press are incorporated herein by reference to indicate the conventionality of the ammonia oxidation-nitric oxide oxidation-water absorption method for the production of nitric acid. An additional description of nitric acid production further indicative of the background of this invention, also incorporated by reference, is provided in the Kirk-Othmer *Encyclopedia of Chemical Technology*, Second Edition, Volume 13, pages 796 to 814.

In conventional nitric acid production by the ammonia oxidation-nitric oxide oxidation-water absorption method, the unabsorbed gases from the nitrogen peroxide absorption step (tail gases) are vented to the atmosphere, with or without further treatment to lower the nitrogen oxide content thereof. These unabsorbed gases may contain from about 0.1 to 0.5% by volume of nitrogen oxides. Normally, the nitrogen oxides content is from about 0.2 to 0.4% by volume of these gases. Even using conventional treatment techniques such as catalytic combustion of the nitrogen oxides with a fuel gas over a noble metal catalyst to form elemental nitrogen, the treated gases contain unduly high levels of nitrogen oxide pollutants. Other known procedures for combatting pollution include both chemical absorption with alkali solutions and physical absorption with molecular sieves.

In accordance with this invention, the improved method of production of nitric acid by the ammonia oxidation-nitric oxidation-water absorption method is characterized by employing a high oxygen content gas as the source of oxygen supply for the process wherein the total amount of molecular oxygen available for oxidation is up to about 20 volume percent in excess of the amount required for complete oxidation of the ammonia to nitric acid on a stoichiometric basis, and recycling at least about 40 volume percent of the tail gas. In the process, a substantial decrease in the amount of nitrogen oxides vented to the atmosphere may be obtained in the production of nitric acid by the ammonia oxidation-nitric oxide oxidation-water absorption method, compared to the levels achieved using only conventional treatment for nitrogen oxide content reduction. As pollution emission requirements are lowered, the tail gas recycle process of this invention may become the only feasible means to achieve the extent of pollution abatement required. Moreover, the use of tail gas recycle can increase the absorption efficiency for nitrogen oxides in the manufacturing process from about 98% to about 100% (99.95+%).

The overall reaction in the production of nitric acid by the ammonia oxidation-nitric oxide oxidation-water absorption method is expressed as:

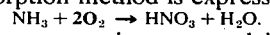
$NH_3 + 2O_2 \rightarrow HNO_3 + H_2O$.

Since oxygen is consumed in the overall process, a fresh supply must be continuously added to replace the amount consumed, hereinafter referred to as make-up oxygen. When air is used for this purpose, a large quantity of nitrogen is necessarily introduced along with the oxygen. Nitrogen is not one of the reactants in the process and, therefore, must be eliminated (purged) from the system in the same quantity that it enters or is formed in the system. The nitrogen must be eliminated in any case whether the oxygen supply is from air or some other more highly concentrated source of oxygen. With regard to pollution abatement, the advantage of a concentrated oxygen supply is that the purge requirement is reduced accordingly. It is the purged gas which carries the nitrogen oxide pollutants to the atmosphere. Therefore, the smaller the purge necessary, the smaller the pollution emission.

When using air as a source of oxygen there is no advantage to tail gas recycle. Any portion of the tail gas recycled would have an adverse effect on the process by increasing the partial pressure of the non-reacting nitrogen and reducing the partial pressure of the process reactants. The fraction of the tail gas that could be tolerated for recycle when air is used is so small as to make no noticeable contribution to pollution abatement. For all practical purposes it can be said that when air is used as the source of oxygen the purge must be 100% of the tail gas, (i.e., tail gas and purge gas are one and the same). In this case all of the nitrogen oxides in the gas leaving the absorber are either discharged directly to the atmosphere, or before discharge to the atmosphere, the tail gas passes through a purification unit, usually a catalytic combustor, which lowers the nitrogen oxide content.

When 100% oxygen is used instead of air, the only purge requirement is that which is necessary to remove the small quantity of molecular nitrogen formed by side reactions in the nitric acid preparation process. This amounts to less than 0.2% of the tail gas stream. The remaining portion of over 99.8% can be recycled, thus almost totally eliminating the discharge of nitrogen oxides to the atmosphere.

It is not normally economically practical to use 100% oxygen; however, oxygen of 98 volume percent purity is a readily available commercial grade, and this is the purity used as the basis of the material balances set forth in this application. Higher or lower content oxygen-containing gas could be used, and the necessary purge requirements would decrease or increase accordingly. For the most worthwhile nitrogen oxide emission reduction, however, an oxidizing gas containing more than about 30 volume percent molecular oxygen, preferably more than about 50 or 70 volume percent molecular oxygen, and most advantageously about 90 to 99 volume percent molecular oxygen should be utilized. These amounts are based on the total charge to the oxidation reaction zones minus the ammonia feed and tail gas recycle.

It is desirable that the molecular oxygen be employed in at least the amount required to oxidize the ammonia to nitrogen peroxide and form nitric acid on a stoichiometric basis, and preferably only up to about 20 volume percent in excess of that amount on the stoichiometric basis, in order to reduce the amount of oxygen make-up gas entering the system. Thus, savings can be realized in not only the cost of the oxygen-rich make-up gas required per unit of nitric acid product but also, savings may be realized in that since less oxygen make-up gas enters the system, a lesser mass of incoming gas needs to be compressed to the desired operating pressure for the ammonia oxidation. Also, the amount of unreacted oxygen in the tail gas from the absorption stage is low, and the loss of oxygen through purging is minimized. The molecular oxygen available for oxidation with the ammonia may be provided by both the oxygen make-up gas and the recycle gas, and is preferably from about 5 to 15, volume percent in excess of the amount required to oxidize the ammonia to nitrogen peroxide, and form nitric acid.

Figure 2:
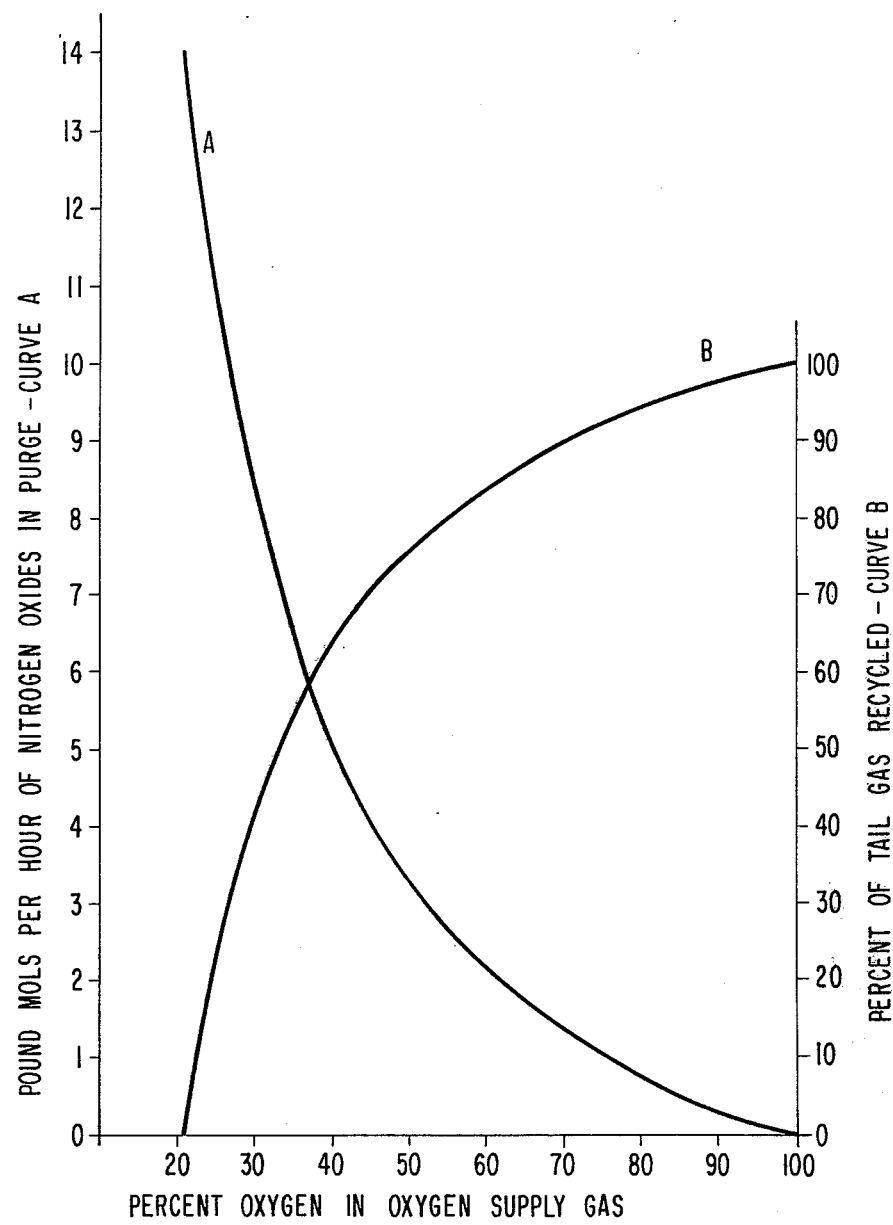

The present invention will be further described in connection with the drawings in which:

FIG. 1 is flow diagram illustrating the process of this invention as well as the usual procedure for making nitric acid; and FIG. 2 is a graph charting the parameters of the amount of nitrogen oxides in the purge gas and the percent of tail gas recycled against the percent oxygen in the supply gas.

FIG. 1 represents the conventional nitric acid plant in solid lines and also represents in broken lines the modification of the present invention providing substantially reduced nitrogen oxide emission. The comparison of the conventional air-utilizing procedure and the high oxygen content gas-utilizing procedure of this invention presented by FIG. 1 shows the order of nitrogen oxide emission reduction possible using the process of this invention. Essentially, the emission is reduced by purging only a portion of the tail gas and recycling the remainder. To accomplish substantial nitrogen oxide reduction at least about 40 volume percent and advantageously a major portion, e.g. about 50 volume percent or more, of the tail gas should be recycled to the process stages. When amounts of recycle tail gas are referred to herein it is meant the total amount of tail gas recycled to the process stages. Preferably, however, at least 90 volume percent and even over about 95 volume percent of the tail gas is recycled. Under normal operating conditions at least a slight purge is generally necessary to eliminate the built-up molecular nitrogen from the process. Thus, normally at least about 0.2 volume percent or even at least about 0.5 volume percent when using less than 100% oxygen as the oxidation gas, of the tail gas, is purged to eliminate built-up molecular nitrogen from the system. The recycling of tail gas is made possible by the use of a high oxygen content gas rather than air as the source of oxygen supply for the nitric acid manufacturing process.

The recycle gases, therefore, serve to maintain the concentration of ammonia for oxidation below the explosive range, i.e., below about 13.5 volume percent for a mixture of ammonia and pure oxygen. The recycle gases provide an economically desirable inert diluent to avoid explosive mixtures of ammonia and oxygen in that the tail gas is readily available and of a pressure approximating the pressure in the ammonia oxidation zone. Generally, the ammonia comprises about 6 to 11.5 or 12, preferably about 6 to 10 volume percent of the total ammonia, oxygen make-up gas, and recycle gas. Ammonia concentrations below about 6 volume percent may be employed but are not generally used in commercial operations due to the higher gas volumes per unit product that need to be processed in the system and the low partial pressure of that reactant. Since the oxygen make-up gas provides, in combination with the molecular oxygen contained in the recycle gas, up to about 20 volume percent in excess of that required to oxidize the ammonia to nitrogen peroxide and form nitric acid, on a stoichiometric basis, it follows that the tail gas from the absorption unit will contain only minor amounts of oxygen, say less than about 8, preferably less than about 5, volume percent molecular oxygen, thus, nitrogen will generally comprise a major amount of the tail gas, e.g., at least about 90 volume percent of the tail gas.

The process of this invention, by using oxygen make-up gas having a molecular oxygen content of more than about 30% by volume, an oxygen concentration of up to about 20 volume percent in excess of the amount required for complete oxidation of the ammonia to nitrogen peroxide on a stoichiometric basis, and by returning at least 40 volume percent of the tail gas to the process stages, defines a system in which the nitrogen oxides emissions from the plant are substantially lowered. The reduction of nitrogen oxides emissions provided by the system of this invention is of particular significance and makes adoption of the system of this invention commercially attractive. For instance, when the make-up oxygen stream contains 98 percent molecular oxygen, the purge stream from a 500 ton per day nitric acid plant may contain as little as 0.09 moles of nitrogen oxides as compared with 14 moles per hour of nitrogen oxides in the purge stream from a similar plant except employing air as the source of oxygen.

Referring to FIG. 1, the first stage of the process occurs in converter 1 where ammonia is reacted with a portion of the oxygen-bearing gas which has been heated by indirect heat exchange with converter effluent passing through the air heater. Nitric oxide is formed in converter 1. The converted effluent is then further cooled by indirect heat exchange with steam to superheat the latter and then with water to generate steam, the cooled converter effluent then passing through a platinum filter.

The second oxidation stage occurs primarily at the cooler-condenser 2 wherein a separate portion of the oxygen-bearing gas is admitted to oxidize nitric oxide to nitrogen peroxide. However, this reaction continues to some degree throughout the absorber 3. Additionally, acid is formed in the cooler-condenser 2 by reaction of nitrogen peroxide with condensed water. The nitrogen peroxide and acid are advanced to the lower portion of the absorber 3 where the third stage of the process occurs. The effluent from the cooler-condenser passes into water in absorber 3 so that nitrogen peroxide is absorbed into the water to produce nitric acid of the required concentration, which is removed from the bottom of the absorber. Fresh water as required is added to the top of the absorber 3 and contacts nitrogen peroxide as the process gas flows upwardly through the tower.

In the conventional plant, tail gas leaving the absorber 3 is either vented directly to the atmosphere or further treated to lower the nitrogen oxide content. This treatment is usually by catalytic reduction as previously described, using conventional equipment as shown in FIG. 1. The reactions occur in the catalytic combustor 5 wherein a portion of the nitrogen oxides are converted to nitrogen after the temperature of the tail gas is raised in heater 4. The steam generator 6 following the combustor is merely a heat recovery device. Before final discharge to the atmosphere, the tail gas flows through an expander 7 for power recovery. The expander in conjunction with a turbine powers a compressor system which takes air from the atmosphere and raises its pressure to say 130 psig for charging to converter 1 via the air heater and cooler-condenser 2, as aforesaid. In the tail gas recycle plant of the present invention none of this equipment marked with an X is required. In this latter case, in order to eliminate the excess of nitrogen from the system, it is necessary to divert only a fraction of the tail gas stream to the atmosphere through purge 9. Nitrogen from the oxygen plant can join the purge gas passing to the stack as shown. The remaining portion of the tail gas is recycled by use of a recycle compressor 8 to overcome the pressure loss through the system.

For simplicity, the diagram of FIG. 1 shows 98% oxygen from an oxygen plant as being introduced into the tail gas recycle stream directly ahead of the recycle compressor. From the disclosures of the invention, it will become apparent to those knowledgeable in the manufacture of nitric acid that various process advantages may be obtained by the introduction of a portion of the oxygen supply at the nitric oxide oxidation stage of the process or even separately introducing portions of the total oxygen requirement at the beginning of each of the three process stages. The effective pressure of the system may thus be increased by increasing the partial pressure of oxygen at the stage of process into which it is introduced. Compared to a conventional plant and considering the production of a constant quantity of nitric acid, this will result in the permissible use of smaller equipment for a fixed total pressure and acid strength, or use of a lower total pressure for a fixed acid strength and equipment size, or production of higher strength acid for a fixed total pressure and equipment size.

The effective pressure of the system may also be increased with similar results by reducing the partial pressure of nitrogen in the system which per se increases the partial pressure of oxygen at any fixed total system pressure. The nitrogen partial pressure may be adjusted upwards or downwards as desired by regulation of the amount of tail gas purged.

The following data indicate the reduction in nitrogen oxide emission achievable by the process of this invention. A comparison utilizing conventional air oxidation of ammonia and the high oxygen content gas oxidation with tail gas recycle of this invention in a 500 ton/day nitric acid plant is shown by the following overall material balances:

shown in FIG. 1. Should there be more profitable uses for the nitrogen, or should it be more economical to purchase oxygen from a producer, the concentration may be diluted with air or other innocuous gas that may be available.

Although it is apparent that the quantity of emission of nitrogen oxides to the atmosphere may thus be controlled solely by use of the tail gas recycle process of this invention, there are instances when it may be more economical to use tail gas recycle in conjunction with a conventional purge gas treatment such as catalytic combustion or physical or chemical absorption.

FIG. 2 of the drawings shows variations in the quantity of nitrogen oxides in the purge gas and variations in the percent of tail gas recycled in the present invention compared to corresponding variations in the percent oxygen in the oxygen-supply gas, the make-up oxygen which essentially replaces that consumed in the oxidation stages. For example, FIG. 2 indicates that the nitrogen oxides in the purge gas are reduced by 50% even when using an oxygen-supply gas containing only one-third oxygen by volume. A low purity supply such as this may be available as a by-product or otherwise at

OVERALL MATERIAL BALANCES

Conventional Plant

|  | Ammonia mols/hr. | mol. % | Air mols/hr. | mol. % | Tail Gas (Purge) mols/hr. | mol. % |
|---|---|---|---|---|---|---|
| $NH_3$ | 696 | 100.0 | — | — | — | — |
| $O_2$ | — | — | 1563 | 20.9 | 184 | 3.00 |
| $N_2$ | — | — | 5881 | 78.5 | 5892* | 96.05 |
| $NO_2$ | — | — | — | — | 14 | 0.23 |
| $H_2O$ | — | — | 44 | 0.6 | 44 | 0.72 |
| Total | 696 | 100.0 | 7488 | 100.0 | 6134 | 100.0 |

Oxygen reacted 1563 − 184 = 1379 mols/hr.
Tail gas purged - 100%
Tail gas recycled - none.

*The increase in nitrogen is due to the fact that a small amount of nitrogen is formed by side reactions which occur in the converter.

Recycle Plant of This Invention

|  | Tail Gas Purged mols/hr. | Tail Gas Recycled mols/hr. | Oxygen Added mols/hr. | Recycled Gas-Oxygen Mixture mols/hr. | mol. % |
|---|---|---|---|---|---|
| $O_2$ | 1 | 183 | 1380 | 1563 | 20.8 |
| $N_2$ | 39 | 5853 | 28 | 5881 | 78.4 |
| $NO_2$ | 0.09 | 13.91 | — | 13.91 | 0.2 |
| $H_2O$ | 0.29 | 44 | — | 44 | 0.6 |
| Total | 40 | 6094 | 1408 | 7502 | 100 |

Ammonia - same.
Oxygen Reacted - same.
Total Tail Gas - same.
Tail Gas Purged - 0.65%.
Tail Gas Recycled - 99.35%.

The material balances show that using 98% oxygen as the oxygen supplying gas in place of air, 13.91 of 14 moles of unabsorbed nitrogen oxides in the tail gas may be recycled. Using the process of this invention the emission of nitrogen oxides compared to untreated tail gas may be reduced by a factor of more than 150.

The data above show that by the process of this invention the quantity of nitrogen oxide emission may be drastically reduced. However, it is to be noted that absent further treatment the concentration (but not the overall amounts) of nitrogen oxides in recycle plant purge gas is the same as in the untreated tail gas from the conventional plant. If desired to do so, a simple way to reduce the nitrogen oxide concentration is by dilution with nitrogen available from the oxygen plant as considerably lower cost than high purity oxygen. In this case it may be economically advantageous to use a purge gas treatment in conjunction with tail gas recycle. Since one-half of the tail gas could be recycled for a given nitrogen oxide discharge, the purge treating unit would be only one-half as large as required without tail gas recycle, and more important, the nitrogen oxides emitted to the atmosphere would be only one-half the quantity that could be obtained by purge treatment only. Similarly when using an oxygen-supply gas containing 50% oxygen, about 75% of the tail gas is recycled, the size of the purge treating unit is one-fourth as much as would result from purge treatment only. The following data are represented in FIG. 2:

| | % Oxygen in Oxygen-Supply Gas | | | | | | |
|---|---|---|---|---|---|---|---|
| | (Air) 21 | 30 | 33.33 | 35 | 40 | 50 | 60 |
| % Tail Gas Recycled | 0.0 | 40.9 | 49.9 | 52.6 | 63.0 | 75.6 | 83.9 |
| % Tail Gas Purged | 100.0 | 59.1 | 50.1 | 47.4 | 37.0 | 24.4 | 16.1 |
| Mole/Hr. $NO_2$ in Purge | 14.0 | 8.27 | 7.01 | 6.64 | 5.18 | 3.42 | 2.25 |
| | 70 | 75 | 80 | 90 | 95 | 98 | 100 |
| % Tail Gas Recycled | 89.6 | 92.0 | 94.1 | 97.2 | 98.6 | 99.35 | 99.81 |
| % Tail Gas Purged | 10.4 | 8.0 | 5.9 | 2.8 | 1.4 | 0.65 | 0.19 |
| Mole/Hr. $NO_2$ in Purge | 1.46 | 1.12 | 0.83 | 0.39 | 0.20 | 0.09 | 0.03 |

It is claimed:

1. In a process for making nitric acid in an oxidation-absorption system by the ammonia oxidation-nitric oxide oxidation-water absorption procedure, in which ammonia is oxidized with an oxygen-containing gas to form nitric oxide, the nitric oxide is further oxidized with an oxygen-containing gas to form $NO_2$, and the $NO_2$ is absorbed in water to form a solution of nitric acid, and in which nitrogen oxides are discharged from the oxidation-absorption system in a purge gas stream from said water absorption, the improvement comprising charging to the ammonia oxidation reaction zone ammonia and as recycle at least about 40 volume percent of the unabsorbed gas exiting from said water absorption, said unabsorbed gas having a major amount of nitrogen and a minor amount of oxygen and nitrogen oxides, and charging make-up oxygen to the oxidation system as a molecular oxygen-containing gas having a molecular oxygen content of more than about 30 percent by volume to provide a total amount of molecular oxygen in the oxidation system of up to about 20 volume percent in excess of the stoichiometric amount required for complete oxidation of the ammonia to nitrogen peroxide and form nitric acid, said chargings of ammonia, recycle unabsorbed gas and make-up, oxygen-containing gas being such to maintain the concentration of ammonia below the explosive limit, and purging from the oxidation-absorption system a minor portion of the unabsorbed gas from said water absorption containing a major amount of nitrogen and a minor amount of oxygen and nitrogen oxides, said purging being in an amount sufficient to prevent nitrogen build-up in the oxidation-absorption system.

2. The process of claim 1 wherein the ammonia comprises about 6 to 12 volume percent of the total ammonia, oxygen make-up gas, and recycle gas.

3. The process of claim 1 wherein the recycle gas contains less than about 8 volume percent oxygen.

4. The process of claim 1 wherein nitrogen comprises at least 90 volume percent of the unabsorbed gas.

5. The process of claim 4 wherein the recycle gas contains less than about 5 volume percent oxygen.

6. The process of claim 1 wherein the oxygen make-up gas has a molecular oxygen content of more than about 50 volume percent.

7. The process of claim 6 wherein the oxygen make-up gas has a molecular oxygen content of about 90 to 99 volume percent.

8. The process of claim 7 wherein at least 90 volume percent of the unabsorbed gas is recycled.

9. The process of claim 4 wherein at least 90 volume percent of the unabsorbed gas is recycled.

* * * * *